United States Patent [19]
Yoshikawa et al.

[11] Patent Number: 5,457,166
[45] Date of Patent: Oct. 10, 1995

[54] PROCESS FOR PREPARING A POLYESTER-MODIFIED SILICONE RESIN AND A CURABLE COMPOSITION COMPRISING THE POLYESTER-MODIFIED SILICONE RESIN

[75] Inventors: Yuji Yoshikawa; Tadashi Takahashi, both of Annaka; Mitsuhiro Takarada, Takasaki, all of Japan

[73] Assignee: Shin-Etsu Chemical Co., Ltd., Tokyo, Japan

[21] Appl. No.: 278,193

[22] Filed: Jul. 21, 1994

[30] Foreign Application Priority Data

Aug. 10, 1993 [JP] Japan ..................................... 5-218101
Apr. 28, 1994 [JP] Japan ..................................... 6-113784

[51] Int. Cl.$^6$ ........................................................ C08F 20/00
[52] U.S. Cl. ............................... 525/446; 528/14; 528/26
[58] Field of Search ........................... 528/26, 14; 525/446

[56] References Cited

U.S. PATENT DOCUMENTS 2,584,344  2/1952  Goodwin, Jr. et al. .
3,919,438  11/1975  Urkevich ................................. 525/446
4,069,178  1/1978  Mikami et al. .

FOREIGN PATENT DOCUMENTS 504115    7/1954   Canada .
0035274   9/1981   European Pat. Off. .
1165867  12/1960   Germany .
5255638  10/1993   Japan .
740265   11/1955   United Kingdom .

OTHER PUBLICATIONS

Grant, Hackh's Chemical Dictionary, 4th ed (1972), p. 533.

*Primary Examiner*—Melvyn I. Marquis
*Attorney, Agent, or Firm*—Lowe, Price, Leblanc & Becker

[57] ABSTRACT

A process for preparing a polyester-modified silicone resin comprises mixing an alkoxysilane and/or its hydrolyzate, i.e. an alkoxysiloxane, and a polyester resin having at least two hydroxyl groups in the molecule, and subjecting the mixture to hydrolysis and polycondensation reactions in the presence of an acid catalyst. This process is performed by a continuous one-stage reaction sequence including hydrolysis, polycondensation and modification and is simplified. A composition comprising the polyester-modified silicone resin is also described. The composition comprising organozinc compounds along with the modified silicone resin is significantly improved in heat resistance and color-difference.

21 Claims, No Drawings

PROCESS FOR PREPARING A POLYESTER-MODIFIED SILICONE RESIN AND A CURABLE COMPOSITION COMPRISING THE POLYESTER-MODIFIED SILICONE RESIN

BACKGROUND OF THE INVENTION

1. Field of the Invention

This invention relates to a process for preparing a polyester-modified silicone resin by a simple preparation procedure. The invention also relates to a curable silicone resin composition which comprises a polyester-modified silicone resin of the type mentioned above and also to a cured product obtained therefrom.

2. Description of the Prior Art

As is known in the art, polyester-modified silicone resins have good weatherability and heat resistance and also have such good characteristics as to suffer only a reduced degree of discoloration through thermal degradation on comparison with those of other types of modified silicone varnishes. Thus, the polyester-modified silicone resins have wide utility in the fields of paints or varnishes for buildings, automobiles, mufflers for transport planes, cooking utensils and the like.

In usual practice, polyester-modified silicone resins have been prepared by initially preparing polyester resins from saturated polybasic acids and polyhydric alcohols, and then preparing silicone resins by hydrolysis and condensation of chlorosilane or alkoxysilanes as having a molecular weight of about 1,000. Subsequently, such silicone resins are subjected to dehydration or de-alcoholization condensation reaction with the polyester resins in the presence of a metallic catalyst, such as a titanium catalyst, thereby obtaining the modified silicone resins.

However, the above process broadly comprises the three steps including the step of preparing a polyester resin, the step of preparing a silicone resin, and the step of the modification. Thus, the process is complicated in its procedure.

Moreover, the resultant polyester-modified silicone resins have to be cured under high temperature and long-term heating conditions or by use of curing catalysts, such as a lead catalyst, in order to obtain a cured film having optimum hardness and wear resistance. The high temperature and long-term heating conditions require high costs, and the use of the lead catalyst presents a problem on safety.

The cured film obtained from polyester-modified silicone resins may suffer yellowing owing to its low heat resistance. To avoid this, it is known to add zinc compounds to the silicone resins, by which the heat resistance and yellowing deficiency can be improved to an extent (Japanese Laid-open Patent Application No. 5-255638). However, the zinc compounds have no catalytic action on the curing reaction. For polyester-modified silicone resins prepared according to known processes, it is essential to use curing catalysts such as of lead in order to obtain high curability.

SUMMARY OF THE INVENTION

It is an object of the invention to provide a process for preparing a polyester-modified silicone resin which overcomes the problems of the prior art process.

It is another object of the invention to provide a process for preparing a polyester-modified silicone resin having good curability by a simple procedure.

It is a further object of the invention to provide a curable composition which comprises the polyester-modified silicone resin prepared according to the process set out above whereby the composition is curable at low temperatures without use of any catalyst such as of harmful lead to provide a cured film having a good heat resistance.

It is a still further object of the invention to provide a curable composition which comprises, aside from the polyester-modified silicone resin, an organozinc compound whereby the heat resistance is significantly improved without a sacrifice of adhesion, strength and stability, and little yellowing deficiency is observed when the composition is applied in the form of a white paint.

The above objects can be achieved, according to one embodiment of the invention, by a process for preparing a polyester-modified silicone resin which comprises mixing at least one member selected from alkoxysilanes and alkoxysiloxanes derived from the alkoxysilanes with a polyester resin having at least two hydroxyl groups in the molecule, and subjecting the resulting mixture to hydrolysis and polycondensation reactions in the presence of an acid catalyst therefor.

It is preferred to use as the catalyst aliphatic or aromatic carboxylic acids or anhydrides thereof for the reason described hereinafter.

In the practice of the invention, the hydrolysis of an alkoxysilane and/or alkoxysiloxane, the formation of a silicone resin through polycondensation of the resulting hydrolyzate or hydrolyzates, and the modification through the polycondensation between the silicone resin and the polyester resin wherein the silanol groups in the silicone resin and the hydroxyl groups in the polyester resin undergo the polycondensation reaction proceed continuously in one step. Thus, the production procedure becomes significantly simplified. This process of the invention is very advantageous from the industrial viewpoint.

The catalyst will promote the hydrolysis such as of alkoxysilanes and/or alkoxysiloxanes. When aliphatic or aromatic carboxylic acid or its anhydride is employed as the catalyst for the hydrolysis, the acid or anhydride thereof takes part in the condensation with the hydroxyl groups or silanol groups in the modified resin and is taken in the resin. Hence, no neutralization for the acid is necessary. In general, where catalysts for hydrolysis are used and left in a final resin in a free condition, the storage stability of the resin is impeded. To avoid this, it is necessary to eliminate the catalyst such as by neutralization. In the practice of the invention, such a neutralization step is not required at all, thus being very advantageous in the sense of industrial production.

The polyester-modified silicone resin prepared according to the process of the invention is better in curability than polyester-modified silicone resins prepared according to the known procedure and has unexpectedly the advantage that the resin can provide a film which has high hardness and high bending strength. Probably, this is because active functional groups are likely to be left in the modified silicone resin, so that uniform curing reaction takes place.

According to another embodiment of the invention, there is provided a curable composition which comprises the polyester-modified silicone resin prepared according to the process set out hereinabove. Preferably, the composition consists essentially of the polyester-modified silicone resin. More preferably, the composition should further comprise from 1 to 15 parts by weight of an organozinc compound whereby the resultant cured film has an improved heat resistance and undergoes little yellowing when the composition is applied as a white paint.

DETAILED DESCRIPTION AND EMBODIMENTS OF THE INVENTION

The starting materials used in the process of the invention are first described.

The polyester resin which is used for modification of silicone resins is one which is ordinarily used for this purpose. The polyester resin should have at least two hydroxyl groups in one molecule. More particularly, the hydroxyl groups are condensed with the silanol or alkoxy groups in silicone resins, thereby permitting the silicone resin to be modified. Such polyester resins are readily obtained by esterification between saturated polybasic acids and polyhydric alcohols.

Examples of the saturated polybasic acids include isophthalic acid, terephthalic acid, phthalic anhydride, tetrahydrophthalic anhydride, adipic acid and mixtures thereof. Examples of the polyhydric alcohols include ethylene glycol, diethylene glycol, propylene glycol, glycerin, neopentyl glycol, trimethylolethane, trimethylolpropane and mixtures thereof.

In order to permit a polyester resin to have at least two hydroxyl groups in the molecule, the molar ratio between the saturated polybasic acid and the polyhydric alcohol used for the esterification is such that the OH groups of the polyhydric alcohol are in excess by mole relative to the COOH groups of the polybasic acid, e.g. the HO group is present in an amount of from 1.02 to 3.00 moles per mole of the COOH group. The resultant polyester resin has an acid value of not larger than 10, preferably not larger than 5.

The polyester resin used has a molecular weight which depends properly on the intended properties of final modified silicone resins and which is generally in the range of from 1,000 to 20,000 on average. The polyester resin may be solid in nature and is usually provided for reaction with alkoxysilanes and/or alkoxysiloxanes after dilution with solvents to an extent of 50 to 95%. Such solvents include, for example, cellosolve solvents such as ethylene glycol monoethyl acetate (cellosolve acetate), glycol solvents such as propylene glycol, hydrocarbon solvents such as xylene, alcohols, esters, ketones and the like. These may be used singly or in combination.

The other ingredient used in combination with polyester resin includes, alkoxysilanes, alkoxysiloxanes and the mixtures thereof.

In the practice of the invention, in order to form a silicone resin in coexistence of the polyester resin, alkoxysilanes and/or partially hydrolyzed condensates thereof, i.e. alkoxysiloxanes, are used.

These alkoxysilanes or partially hydrolyzed condensates are represented, for example, by the following general formula (1)

$$(Ph)_a(R^1)_b(OR^2)_c SiO_{[4-(a+b+c)]/2} \quad (1)$$

wherein Ph represents a phenyl group, $R^1$ represents an alkyl group having from 1 to 8 carbon atoms or an aralkyl group, $R^2$ represents an alkyl group having from 1 to 6 carbon atoms, and a, b and c are, respectively, such values that $0 \leq a < 3$, $0 \leq b < 3$ and $0 < c \leq 4$ provided that $0 < a+b+c \leq 4$.

Where a heat resistance is essential and miscibility with the polyester resin is necessary, it is preferred to use phenyl group-containing silanes and/or siloxanes. More particularly, in the above general formula (1), $a > 0$. Although not limitative, typical examples of the alkoxysilane used in the present invention include those indicated below and used singly or in combination: 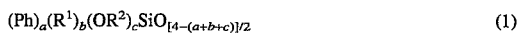 $(C_6H_5)_2Si(OC_2H_5)_2$, $Si(OCH_3)_4$, $Si(OC_2H_5)_4$ and the like.

The alkoxysiloxanes are derived from the alkoxysilanes through partial hydrolysis and condensation and are preferably dimers to tetramers thereof on average.

These silanes and/or siloxanes are used in an amount of from 20 to 1,000 parts by weight, preferably from 50 to 800 parts by weight, per 100 parts by weight of the solid polyester resin.

If it is desirable to impart release properties to the cured film obtained from a final polyester-modified silicone resin, alkoxy group-containing dimethyl silicone may be used in combination. In the case, the dimethyl silicone is added in an amount of 0.01 to 5 parts by weight per 100 parts by weight of the solid polyester.

The catalyst used in the process of the invention promotes hydrolysis of the alkoxysilane or alkoxysiloxane. For this purpose, there are used aliphatic or aromatic carboxylic acids and anhydrides thereof. Preferably those acids or anhydrides which are soluble in water or alcohols used in the mixing step of the starting materials at temperatures not higher than 50° C. Specific examples include oxalic acid, lactic acid, acetic acid, malic acid, adipic acid, maleic acid, phthalic acid, benzoic acid, maleic anhydride, phthalic anhydride, benzoic anhydride and the like.

The above-indicated catalysts not only promotes the hydrolysis of the alkoxysilanes and/or alkoxysiloxanes, but also reacts with the hydroxyl groups, silanol groups or alkoxysilyl groups in the modified resin. Thus, the catalyst is taken in the resin. This is very advantageous in that it is not required to remove the acid catalyst through neutralization after the modification reaction. It should be noted that if monocarboxylic acids are used, the monocarboxylic acid taken in the modified resin are invariably left at terminal ends of the resin molecules. This may sometimes impede the stability of the resin. Accordingly, it is most preferred to use polybasic acids and/or anhydrides thereof. Nevertheless, if it is required, monocarboxylic acids may be used in the process of the invention.

In the practice of the invention, aside from those acids indicated above, there may also be used, if necessary, acid catalysts such as hydrochloric acid, sulfuric acid, nitric acid, methanesulfonic acids and the like, and alkali catalysts. In this case, the resultant modified resin has to be neutralized to remove the catalyst therefrom in order to ensure good storage stability. This will cause the process of the invention to become complicated.

The catalyst is usually used in an amount of from 0.01 to 5 wt. %, preferably from 0.1 to 1 wt. %, based on the alkoxysilane and/or alkoxysiloxane used.

According to the process of the invention, the polyester resin, alkoxysilane and/or alkoxysiloxane, and catalyst set out hereinbefore are mixed, followed by hydrolysis and polycondensation reaction in an aqueous system thereby obtaining a polyester-modified silicone resin. More particularly, the hydrolysis of the alkoxysilane and/or alkoxysiloxane initially proceeds in the aqueous reaction mixture. Subsequently, the formation of a silicone resin by polycondensation of the resultant hydrolyzate and the polycondensation reaction between the thus formed silicone resin and the polyester resin proceed. Thus, a polyester-modified silicone resin can be obtained only by one stage.

The hydrolysis reaction which triggers the subsequent reactions starts to proceed by addition of water to the reaction system. The amount of water should preferably be in the range of 0.8 to 2.0 times by mole as large as the theoretical required for silanolization of all the alkoxy groups in the alkoxysilane and/or alkoxysiloxane.

It is preferred to mix, prior to the hydrolysis reaction, the respective ingredients in appropriate solvents such as, for example, cellosolve solvents (ethylene glycol monoalkyl ethers) and propylene solvents such as butyl cellosolve (ethylene glycol monobutyl ether), cellosolve acetate (ethylene glycol monomethyl ether acetate), propylene glycol monomethyl ether acetate, 3-methyl-3-methoxybutyl acetate, propylene glycol n-butyl ether, 3-methyl-3-methoxybutanol and the like, hydrocarbon solvents such as xylene, toluene and the like, alcohol solvents such as iso-propyl alcohol, iso-butyl alcohol and the like, ester solvents such as ethyl acetate, butyl acetate and the like, ketone solvents such as methyl ethyl ketone, methyl isobutyl ketone and the like, etc. In order to allow uniform dispersion in water, an alcohol solvent such as isopropyl alcohol should preferably be contained as at least a part of such a solvent. These solvents may be used as a diluent for the modified resin obtained after the reaction.

The hydrolysis reaction and subsequent reactions should preferably be effected at a temperature of from 50° to 120° C. The overall reaction is generally completed within a time of 1 to 10 hours. After the completion of the reaction, water formed by the polycondensation is distilled off. Thereafter, such solvents as indicated above are used for dilution of a final modified resin to obtain a solution of a polyester-modified silicone resin at an appropriate concentration.

The modified silicone resin is able to yield a cured film by heating and is thus very useful for application as various types of paints.

In order to further improve the physical properties of the cured film obtained from the modified silicone resin, it is preferred to add an organozinc compound. By the addition of the organozinc compound, the resultant cured film exhibits significantly improved heat resistance with respect to gloss and color difference, without involving any significant lowering of adhesion and stability of the film. The composition which comprises the polyester-modified silicone resin and an organozinc compound is cured at temperatures as low as approximately 150° C. within a relative short time of 10 to 60 minutes without use of any catalyst such as a lead catalyst.

The organozinc compounds useful in the present invention are not critical provided that they are miscible with the polyester-modified silicone resin. Specific and preferred examples include zinc octylate, zinc naphthenate, zinc acetylacetonoate and the like. These may be used singly or in combination.

The amount of the organozinc compound is preferably in the range of from 1 to 15 parts by weight per 100 parts by weight of the polyester-modified silicone resin. If the amount is less than 1 part by weight, the improvement in the heat resistance may not be significant. Over 15 parts by weight, the resultant cured film may not be smooth on the surface thereof.

The composition of the invention may further comprise various additives depending on the purpose in end use of cured film, e.g. adhesion improvers, physical properties modifiers, storage stability improvers, plasticizers, fillers, antioxidants, UV absorbers, pigments and the like, in amounts not impeding the inherent properties of the composition.

The composition of the invention is obtained by dissolving the modified silicone resin in appropriate solvents with or without the organozinc compound. Such solvents may be those set out hereinbefore and include, for example, cellosolve solvents, propylene glycol solvents, hydrocarbon solvents, alcohol solvents, ester solvents, ketone solvents and the like. These solvents may be, of course, used singly or in combination. Alternatively, the same solvent as used for the hydrolysis reaction in order to prepare the modified silicone resin may be employed. Preferably, propylene glycol solvents are used owing to their high dissolving power and safety. Such solvents include, for example, propylene glycol methyl ether acetate, 3-methyl-3-methxoybutyl acetate and the like. In order to improve the stability, it is also preferred to mix an alcohol, such as iso-propyl alcohol, iso-butyl alcohol, in small amounts of from 1 to 20% by weight of the mixture. The concentration of the modified silicone resin is not critical and is determined depending on the purpose.

The present invention is more particularly described by way of example, in which parts are by weight. The viscosity in the example is a measurement at 25° C. Comparative examples are also shown.

PREPARATION OF POLYESTER RESIN 48 parts of trimethylolethane, 12 parts of 3-methyl-3-methoxybutyl acetate and 214 parts of water were charged into an agitated device equipped with a thermometer and a reflux condenser and heated to 90° C. to dissolve trimethylolethane. Subsequently, 49.8 parts of isophthalic acid and 2.2 parts of xylene were further charged, followed by keeping the conditions of 220° C. for 12 hours and removal of the resultant water and alcohol by distillation. Thereafter, 37.3 parts of 3-methyl-3-methoxybutyl acetate was further charged, thereby obtaining a polyester resin solution having an acid value of 3, a nonvolatile content of 70% and a viscosity of 10,000 centipoises.

EXAMPLE 1

122.5 parts of a siloxane of the following formula,

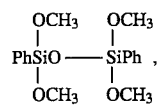

wherein Ph represents a phenyl group, 33.9 parts of a siloxane of the following formula,

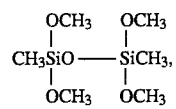

157.7 parts of the polyester resin prepared above, 18.9 parts of water, 32.3 parts of propylene glycol monomethyl ether acetate, 5.5 parts of isopropyl alcohol, and 0.55 parts of maleic anhydride were charged into an agitated device equipped with a thermometer and a reflux condenser, followed by refluxing for one hour. Thereafter, while distilling off the resultant alcohol and water, the reaction system was heated to 120° C., followed by further charge of 67.6 parts of propylene glycol monoethyl ether acetate to obtain a polyester-modified silicone resin having a nonvolatile content of 60% and a viscosity of 500 centistokes.

The resin was applied onto a cold-finished mild steel sheet by use of bar coater No. 36 and air-dried for 30 minutes, followed by curing under conditions of 150° C. and 30 minutes to form a cured film on the sheet. The physical properties of the film are shown in Table 1.

Comparative Example 1

100 parts of the polyester resin obtained above, 100 parts of a methyl phenyl silicone varnish (commercially available from Shin-Etsu Chemical Co., Ltd. under the designation of KR211), and 0.2 parts of tetrabutyl titanate were charged into an agitated device equipped with a thermometer and a reflux condenser, followed by distilling off condensed water at 160° C. over 5 hours. Thereafter, 33.3 parts of cellosolve acetate (ethylene glycol monoethyl ether acetate) was further added to the reaction system to obtain a polyester-modified silicone resin having a nonvolatile content of 60% and a viscosity of 500 centistokes.

The resin was used to form a cured film in the same manner as in Example 1. The physical properties of the film are shown in Table 1.

Comparative Example 2

3 parts of $Pb(OCOC_7H_{15})_2$ having a Pb content of 24% was added to 100 parts of the polyester-modified silicone resin obtained in Comparative Example 1, followed by application in the same manner as in Example 1, air-drying for 30 minutes and curing under conditions of 180° C. and 20 minutes to obtain a cured film. The physical properties of the film are shown in Table 1.

TABLE 1

|  | Example 1 | Comparative Example 1 | Comparative Example 2 |
| --- | --- | --- | --- |
| Pencil Hardness | 2H | 2H | 2H |
| Adhesion by cross-hatch test | 100/100 | 0/100 | 100/100 |
| Mandrel test (2 mmφ) | not cracked | cracked | not cracked |
| Impact Resistance (100 g) | 50 cm< | 5 cm> | 50 cm< |

The above physical properties were determined according to the following test procedures.

The pencil hardness was determined according to the method described in JIS K-5400, items 6 to 14.

The cross-hatch adhesion was determined according to the method described in JIS K-5400, items 6 to 15.

The mandrel test or flexing resistance was carried out according to the method described in JIS K-5400, items 6 to 16, using a mandrel core of 2 mm in diameter.

The impact resistance was determined according to the Du Pont method described in JIS K-5400, items 6 to 13, wherein a steel ball with a diameter of ½ inches was used for the measurement with a load of 100 g.

From the above results, it will be seen that the polyester-modified silicone resin of Example 1 is capable of forming a cured film having good mechanical properties under curing conditions which are unsatisfactory to the polyester-modified silicone resins obtained by the prior art processes of Comparative Examples 1 and 2.

Thus, the process of the invention is very advantageous from the industrial standpoint in that since the hydrolysis, polycondensation and modification steps are carried out by one-stage reaction, polyester-modified silicone resins can be obtained through a reduced number of steps over those of the prior art processes. In addition, the silicone resins obtained by the invention are more readily cured and is able to form a cured film under milder curing conditions with good mechanical properties without use of any curing catalyst, e.g. a lead catalyst, which has a problem on safety.

EXAMPLES 2 to 4 and Comparative Examples 3 to 6

The polyester-modified silicone resins obtained in Example 1 and Comparative Example 1 were used along with organic zinc or lead compound and a titanium oxide pigment (Tipaque R-820 commercially available from Ishihara Ind. Co., Ltd.) and formulated as shown in Table 2, followed by bead agitation to obtain white paints.

TABLE 2

|  | Example | | | Comparative Example | | | |
| --- | --- | --- | --- | --- | --- | --- | --- |
|  | 2 | 3 | 4 | 3 | 4 | 5 | 6 |
| Modified silicone resin (parts) | | | | | | | |
| Resin of Example 1 | 100 | 100 | 100 | 100 | | | |
| Resin of Comparative 1 | | | | | 100 | 100 | 100 |
| Zinc octylate | 3 | 6 | — | | | 3 | — |
| Lead octylate | | | | 3 | 3 | | |
| Titanium oxide R-820 | 18 | 18 | 18 | 18 | 18 | 18 | 18 |

The respective resin compositions of the examples and comparative examples were, each, applied onto a cold-finished mild steel sheet by use of bar coater No. 36 and air-dried for 30 minutes, followed by curing under conditions of 150° C. and 30 minutes to form a cured film on the sheet. The physical properties of the film were measured according to the methods set out hereinbefore with respect to Table 1. The results are shown in Table 3. It will be noted here that the compositions of Comparative Examples 5 and 6 were not possible to measure.

It will also be noted that the films of Comparative Examples 5 and 6 were sticky owing to the insufficient curing and that in order to cure the resin of Comparative Example 1 at a low temperature of 150° C., lead octylate is essentially required.

TABLE 3

|  | Example | | | Comparative Example | |
| --- | --- | --- | --- | --- | --- |
|  | 2 | 3 | 4 | 3 | 4 |
| Pencil hardness | 2H | 2H | 2H | 3H | 2H |
| Adhesion by cross-hatch test | 100/100 | 100/100 | 100/100 | 100/100 | 100/100 |
| Flexing resistance (mandrel | | not cracked | | cracked | not cracked |

TABLE 3-continued

|  | Example | | | Comparative Example | |
|---|---|---|---|---|---|
|  | 2 | 3 | 4 | 3 | 4 |
| test) | | | | | |
| Impact resistance (cm) (determined by the Du Pont method) | 50≦ | 50≦ | 50≦ | 5≧ | 50≦ |

Heat resistance test:

The respective cured film samples were then heated at 250° C. and allowed to stand 200 hours and 500 hours and subjected to measurement of gloss to determine a gloss retention relative to an initial gloss and a color difference. The results are shown in Tables 4 and 5, respectively. It will be noted that the samples of Comparative Examples 5 and 6 were not possible to measure.

Stability of solution:

Seven days after the preparation of each composition, the respective compositions were applied and cured in the same manner as set out before, followed by the heat resistance test in the same manner as set out above. The results are also shown in Tables 4 and 5. In this case, the samples of Comparative Examples 5 and 6 were not possible to measure.

TABLE 4

|  | Example | | | Comparative Example | |
|---|---|---|---|---|---|
|  | 2 | 3 | 4 | 3 | 4 |
| Coating immediately after preparation of composition | | | | | |
| Gloss retention after standing for 200 hours | 83.4 | 87.1 | 74.0 | 72.4 | 78.1 |
| Gloss retention after standing for 500 hours | 65.0 | 72.7 | 53.1 | peeled off | 58.3 |
| Coating after seven days | | | | | |
| Gloss retention after standing for 200 hours | 82.2 | 84.3 | 72.9 | peeled off | 41.3 |
| Gloss retention after standing for 500 hours | 63.7 | 70.2 | 53.8 | | 22.1 |

TABLE 5

|  | Example | | | Comparative Example | |
|---|---|---|---|---|---|
|  | 2 | 3 | 4 | 3 | 4 |
| Coating immediately after preparation of composition | | | | – | |
| Color difference after standing for 200 hours | 0.8 | 0.5 | 2.1 | 72.4 | 78.1 |
| Color difference after standing for 500 hours | 2.1 | 1.2 | 4.8 | peeled off | 58.3 |
| Coating after seven days | | | | | |
| Color difference after standing for 200 hours | 0.8 | 0.7 | 2.4 | peeled off | 2.4 |
| Color difference after standing for 500 hours | 1.9 | 1.6 | 5.3 | | 5.2 |

As will be apparent from the results of Tables 4 and 5, the addition of the organozinc compound as in Examples 2 and 3 is effective in improving the gloss retention and the color difference on comparison with the results of Example 4 wherein no organozinc is used. Of course, the results of Examples 2 and 3 are far better than those of Comparative Examples. In this connection, the results of Example 4 reveal that the stability of the composition is better than that of Comparative Example 4 wherein harmful lead octylate is used although other characteristic properties of Example 4 are similar to those of Comparative Example 4.

Thus, the modified silicone resin compositions of the invention are stable as time passes and can yield cured films which have good adhesion and strength and good heat resistance especially when organozinc compounds are added thereto. The composition can be cured at relatively low temperatures, thus being high in energy efficiency. In addition, the composition is free of any harmful compounds such as lead compounds and involves no ecological problem.

What is claimed is:

1. A process for preparing a polyester-modified silicone resin which comprises mixing at least one member selected from alkoxysilanes or alkoxysiloxanes derived from the alkoxysilanes with a polyester resin having at least two hydroxyl groups in the molecule, and subjecting the resulting mixture to hydrolysis and polycondensation reactions in the presence of an acid catalyst therefor.

2. A process according to claim 1, wherein said polyester resin is one which is obtained from a saturated polybasic acid and a polyhydric alcohol.

3. A process according to claim 2, wherein said saturated polybasic acid having COOH groups and said polyhydric alcohols having OH group are used in such an amount that a ratio by mole between the COOH groups and the OH groups is in the range of 1:1.02 to 1:3.00.

4. A process according to claim 1, wherein said at least one member is a compound of the following general formula

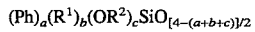

wherein Ph represents a phenyl group, $R^1$ represents an alkyl group having from 1 to 8 carbon atoms or an aralkyl group, $R^2$ represents an alkyl group having from 1 to 6 carbon atoms, and a, b and c are, respectively, such values that $0 \leq a < 3$, $0 \leq b < 3$ and $0 < c \leq 4$ provided that $0 < a+b+c \leq 4$.

5. A process according to claim 4, wherein $0 < a < 3$.

6. A process according to claim 1, wherein said at least one member is present in an amount of from 20 to 1,000 parts by weight per 100 parts of said polyester resin.

7. A process according to claim 1, wherein said catalyst is a member selected from the group consisting of aliphatic and aromatic carboxylic acids and anhydrides thereof.

8. A process according to claim 7, wherein said catalyst consists essentially of a polybasic acid or its anhydride whereby said catalyst reacts with and becomes part of the polyester-modified silicone resin.

9. A process according to claim 1, wherein said catalyst is present in an amount of from 0.01 to 5 wt. % based on said at least one member.

10. A process according to claim 1, wherein said at least one member is hydrolyzed by adding water to the mixture in an amount by mole of 0.8 to 2.0 times the theoretical required for silanolization of overall alkoxy groups in said at least one member.

11. A process according to claim 1, wherein said at least one member and said polyester resin are mixed in a solvent therefor which comprises an alcohol.

12. A process according to claim 1, wherein the hydrolysis and polycondensation reactions are effected at a temperature of from 50° to 120° C.

13. A polyester-modified silicone resin obtained by the process defined in claim 1.

14. A process according to claim 1, wherein said at least one member consists of an alkoxysiloxane derived from an alkoxysilane in the form of a dimer to a tetramer on average obtained through partial hydrolysis and condensation of the alkoxysilane.

15. A polyester-modified silicone resin obtained by the process defined in claim 7.

16. A polyester-modified silicone resin obtained by the process defined in claim 8.

17. A polyester-modified silicone resin obtained by the process defined in claim 14.

18. A curable resin composition which comprises 100 parts by weight of a polyester-modified silicone resin obtained by a process which comprises mixing at least one member selected from alkoxysilanes or alkoxysiloxanes derived from the alkoxysilanes with a polyester resin having at least two hydroxyl groups in the molecule, and subjecting the resulting mixture to an hydrolysis and polycondensation reaction in the presence of an acid catalyst therefor, and 1 to 15 parts by weight of an organozinc compound.

19. A curable resin composition according to claim 18, wherein said catalyst is a member selected from the group consisting of aliphatic and aromatic carboxylic acids and anhydrides thereof.

20. A curable resin composition according to claim 18, wherein said catalyst consists essentially of a polybasic acid or its anhydride whereby said catalyst reacts with said polyester-modified silicone resin and becomes a part thereof.

21. A curable resin composition according to claim 18, wherein said at least one member consists of an alkoxysiloxane derived from an alkoxysilane in the form of a dimer to a tetramer on average obtained through partial hydrolysis and condensation of the alkoxysilane.

* * * * *